(12) United States Patent
Hollinger et al.

(10) Patent No.: US 10,833,886 B2
(45) Date of Patent: Nov. 10, 2020

(54) OPTIMAL DEVICE SELECTION FOR STREAMING CONTENT

(71) Applicant: INTERNATIONAL BUSINESS MACHINES CORPORATION, Armonk, NY (US)

(72) Inventors: Michael C. Hollinger, Austin, TX (US); Nicholas E. Bofferding, Cedar Park, TX (US); Andrew J. Geissler, Austin, TX (US); Adriana Kobylak, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 29 days.

(21) Appl. No.: 16/182,837

(22) Filed: Nov. 7, 2018

(65) Prior Publication Data
US 2020/0145244 A1    May 7, 2020

(51) Int. Cl.
*G06F 15/16* (2006.01)
*H04L 12/28* (2006.01)
*H04L 29/06* (2006.01)

(52) U.S. Cl.
CPC ...... *H04L 12/2809* (2013.01); *H04L 12/2823* (2013.01); *H04L 65/1059* (2013.01); *H04L 65/80* (2013.01); *H04L 2012/2849* (2013.01)

(58) Field of Classification Search
CPC ............. H04L 12/2809; H04L 12/2823; H04L 65/1059; H04L 65/80; H04L 2012/2849
USPC ........................................................ 709/220
See application file for complete search history.

(56) References Cited

U.S. PATENT DOCUMENTS

| | | | |
|---|---|---|---|
| 8,126,155 B2 | 2/2012 | Liu et al. | |
| 9,118,738 B2* | 8/2015 | Archer | H04L 65/605 |
| 9,118,745 B2* | 8/2015 | Foti | H04W 28/26 |
| 9,131,266 B2 | 9/2015 | Guedalia | H04W 4/70 |
| 9,270,944 B2* | 2/2016 | Brooks | H04N 7/17318 |
| 9,277,260 B2* | 3/2016 | Johansson | H04N 21/23106 |
| 9,300,714 B2* | 3/2016 | Bauer | G10L 21/0208 |
| 9,338,203 B2* | 5/2016 | Talvensaari | H04L 65/4084 |

(Continued)

OTHER PUBLICATIONS

U-verse Total Home DVR features, https://www.att.com/esupport/article.html#!/u-verse-tv/KM1009866?gsi...%201%20of&gsi=gk0LcK0, Sep. 21, 2018, Last visited Nov. 7, 2018.

*Primary Examiner* — Melvin H Pollack
(74) *Attorney, Agent, or Firm* — Kunzler Bean & Adamson; Bruce R. Needham

(57) ABSTRACT

An apparatus, method, and system for optimal device selection for streaming content are disclosed. One embodiment of an apparatus includes a stream query module that determines playback parameters of available streaming options for playing user-selected content. A playback environment module determines playback capabilities of connected playback devices and a playback environment of a user of the user-selected content. An analysis module performs a comparison of the available streaming options with the connected playback devices in the playback environment. A device optimization module determines an optimal playback device for playing the user-selected content in the playback environment using the comparison and the playback environment. A computer-implemented method and computer program product also perform the functions of the apparatus.

20 Claims, 5 Drawing Sheets

(56) References Cited

U.S. PATENT DOCUMENTS

| | | | |
|---|---|---|---|
| 9,338,209 B1* | 5/2016 | Begen | H04L 65/601 |
| 9,820,039 B2* | 11/2017 | Lang | H04L 12/2809 |
| 9,986,004 B1* | 5/2018 | Carruth | H04L 65/4084 |
| 10,142,259 B2* | 11/2018 | Phillips | H04L 65/4084 |
| 10,171,853 B2* | 1/2019 | Wallters | H04N 21/2402 |
| 10,284,920 B2* | 5/2019 | Karthikeyan | H04N 21/25808 |
| 10,397,292 B2* | 8/2019 | Grab | H04L 65/605 |
| 10,460,700 B1* | 10/2019 | Mendhekar | H04L 41/0896 |
| 10,484,446 B1* | 11/2019 | Waggoner | H04N 21/8543 |
| 10,498,795 B2* | 12/2019 | Srinivasan | H04L 65/4084 |
| 10,523,978 B1* | 12/2019 | Nielsen | H04N 21/2343 |
| 10,547,662 B2* | 1/2020 | Bouvigne | H04N 21/23439 |
| 10,547,695 B2* | 1/2020 | Maheshwari | G06F 3/0484 |
| 2007/0024705 A1 | 2/2007 | Richter et al. | |
| 2007/0112563 A1 | 5/2007 | Krantz et al. | |
| 2011/0282968 A1 | 11/2011 | Oliver et al. | |
| 2014/0032636 A1 | 1/2014 | Nelson | |
| 2015/0195374 A1* | 7/2015 | Wang | H04L 65/601 709/219 |
| 2017/0034006 A1* | 2/2017 | Rajapakse | H04L 43/16 |
| 2017/0090864 A1 | 3/2017 | Jorgovanovic | |
| 2017/0358313 A1 | 12/2017 | Shih | |
| 2018/0097643 A1* | 4/2018 | Raleigh | H04L 41/0806 |
| 2018/0101611 A1 | 4/2018 | McDevitt et al. | |
| 2018/0242032 A1* | 8/2018 | Viswanathan | H04N 21/43637 |
| 2019/0130136 A1* | 5/2019 | Claypool | H04N 21/26613 |
| 2019/0140939 A1* | 5/2019 | Schooler | H04L 45/3065 |
| 2019/0372839 A1* | 12/2019 | Griffiths | H04N 21/43615 |
| 2019/0373313 A1* | 12/2019 | Jackson | H04N 21/4432 |
| 2020/0019565 A1* | 1/2020 | Ensing | G06K 9/00087 |
| 2020/0037026 A1* | 1/2020 | Sharif-Ahmadi | H04L 67/1021 |

\* cited by examiner

OPTIMAL DEVICE SELECTION FOR STREAMING CONTENT

BACKGROUND

The subject matter disclosed herein relates to streaming content in smart homes and more particularly relates to optimal device selection for streaming content in smart homes.

Smart home systems allow smart home controllers, assistants, and/or command interfaces to connect to and issue commands to smart devices over some type of network connection thereby allowing a user of the smart home system to cause the devices to perform particular functions. Smart home systems may include smart playback devices that are capable of playing back streaming content such as audio, video, and other types of data. In existing smart home systems, users give commands to smart home command interfaces that identify specific sources of streaming content and specific playback devices on which to stream the user selected content.

SUMMARY

An apparatus, method, and system for optimal device selection for streaming content are disclosed. A computer-implemented method and computer program product also perform the functions of the apparatus.

One embodiment of an apparatus for optimal device selection for streaming content includes a stream query module that determines playback parameters of available streaming options for playing user-selected content in response to receiving a command to play the user-selected content. The apparatus includes a playback environment module that determines playback capabilities of connected playback devices and a playback environment of a user of the user-selected content. The apparatus includes an analysis module that performs a comparison of the playback parameters of the available streaming options with the playback capabilities of the connected playback devices in the playback environment. The apparatus includes a device optimization module that determines an optimal playback device for playing the user-selected content using the comparison and the playback environment and causes the user-selected content to be played back on the optimal playback device.

One embodiment of a computer-implemented method for optimal device selection for streaming content includes determining playback parameters of available streaming options for playing user-selected content in response to receiving a command to play the user-selected content. The method further includes determining playback capabilities of connected playback devices and a playback environment of a user of the user-selected content. The method includes performing a comparison of the playback parameters of the available streaming options with the playback capabilities of the connected playback devices in the playback environment. The method further includes determining an optimal playback device for playing the user-selected content in the playback environment using the comparison and the playback environment and causing the user-selected content to be played back on the optimal playback device.

One embodiment of a computer program product includes a computer readable storage medium having program instructions embodied therewith. In the embodiment, the program instructions are executable by a processor to cause the processor to determine playback parameters of available streaming options for playing user-selected content in response to receiving a command to play the user-selected content. The program instructions are further executable by the processor to cause the processor to determine playback capabilities of connected playback devices and a playback environment of a user of the user-selected content. The program instructions are further executable to cause the processor to perform a comparison of the playback parameters of the available streaming options with the playback capabilities of the connected playback devices in the playback environment. In the embodiment, the program instructions are further executable by the processor to cause the processor to determine an optimal playback device for playing the user-selected content in the playback environment using the comparison and the playback environment and causing the user-selected content to be played back on the optimal playback device.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
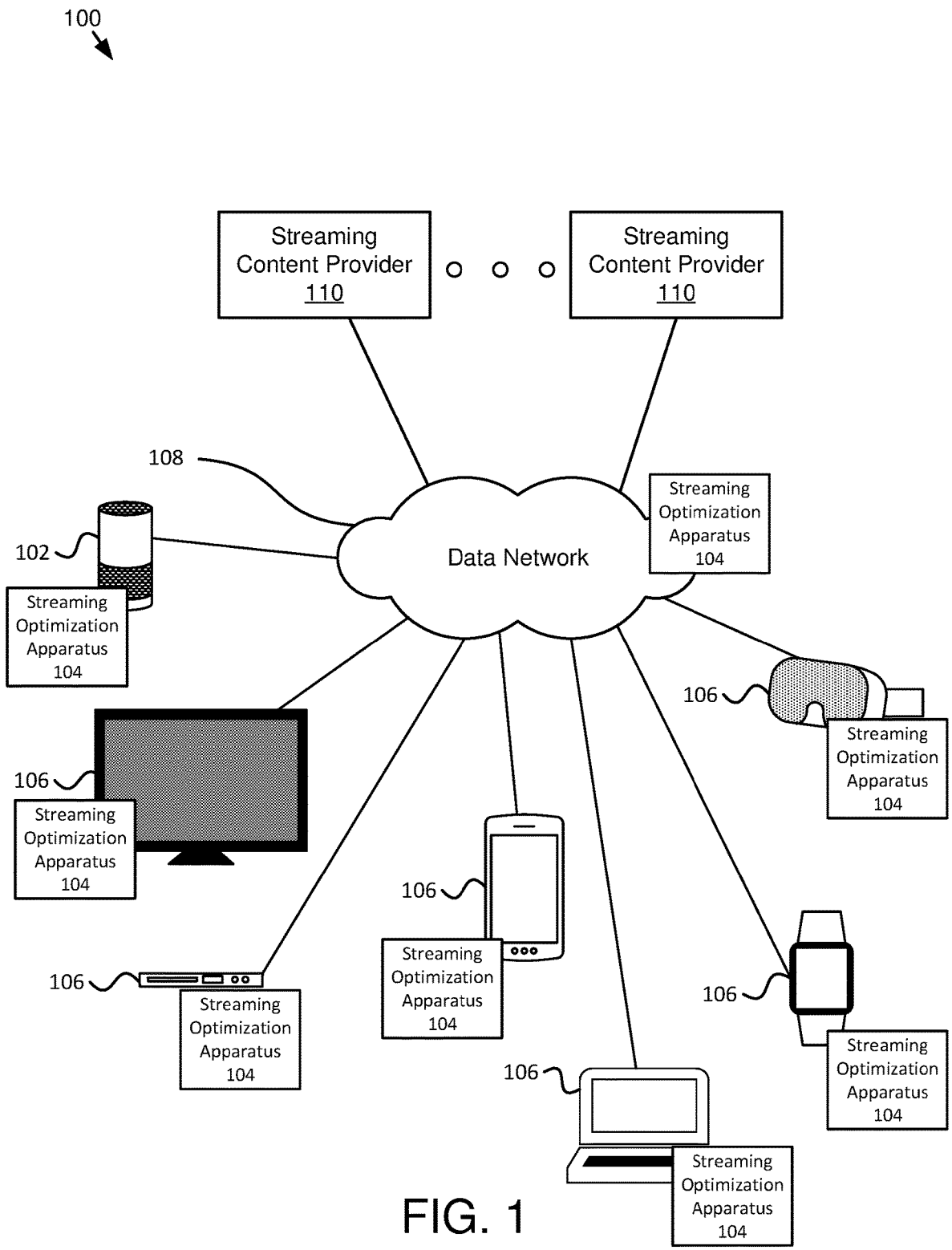
FIG. 1 is a schematic block diagram illustrating one embodiment of a system for optimal device selection for streaming content in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures Like numbers refer to like elements in all figures, including alternate embodiments of like elements.

An apparatus, method, and system for optimal device selection for streaming content are disclosed. One embodiment of an apparatus includes a stream query module that determines playback parameters of available streaming options for playing user-selected content in response to receiving a command to play the user-selected content. The apparatus includes a playback environment module that determines playback capabilities of connected playback devices and a playback environment of a user of the user-selected content. The apparatus includes an analysis module that performs a comparison of the playback parameters of the available streaming options with the playback capabilities of the connected playback devices in the playback environment. The apparatus includes a device optimization module that determines an optimal playback device for playing the user-selected content in the playback environment using the comparison. At least a portion of the modules include one or more hardware circuits, a programmable hardware device and executable code, the executable code stored on one or more computer readable storage media.

In one embodiment, the playback environment module further includes a device quality module that determines a device playback quality for each connected playback device. In certain embodiments, determining a device playback quality for each connected playback device includes streaming a predetermined set of test content to each connected playback device and determining a playback quality rating for each connected playback device. In various embodiments, the analysis module determines a quality of experience score for paired combinations of each available streaming option and each connected playback device for the playback environment In various embodiments, the playback environment module further includes a position module that determines a distance between a user and each connected playback device and the analysis module determines at least a portion of the quality of experience score based on the distance between the user and each connected playback device.

In certain embodiments, the position module further determines a facing direction for the user with respect to each connected playback device and the analysis module determines at least a portion of the quality of experience score based on the facing direction. In various embodiments, the position module determines the distance between the user and each connected playback device and the facing direction for the user based on a comparison of sound measurements of sound traveling between a current location of the user and a device location for each connected playback device, the sound measurements selected from a group consisting of relative timing, relative volume, relative frequency, and combinations thereof.

In some embodiments, the position module further determines a viewing window for the user with respect to each connected playback device and the analysis module determines at least a portion of the quality of experience score based on the viewing window. In certain embodiments, the position module determines the viewing window for the user by analyzing a captured image of the user.

In some embodiment, the playback environment module further determines a bandwidth capability for each connected playback device and determines a bandwidth parameter for each available streaming option, and wherein the analysis module determines at least a portion of the quality of experience score based on a highest degree of matching between the bandwidth capability and the bandwidth parameter. In certain embodiments, the device optimization module excludes playback of user-selected content using a selected stream of the available streaming options in response to the bandwidth parameter of the selected stream exceeding bandwidth capabilities of each connected playback device.

One embodiment of a computer-implemented method includes determining playback parameters of available streaming options for playing user-selected content in response to receiving a command to play the user-selected content. In the embodiment, the method includes determining playback capabilities of connected playback devices and a playback environment of a user of the user-selected content. The method further includes performing a comparison of the playback parameters of the available streaming options with the playback capabilities of the connected playback devices in the playback environment. The method includes determining an optimal playback device for playing the user-selected content in the playback environment using the comparison.

In some embodiments of the method, determining playback capabilities of each connected playback device includes determining a device quality for each connected playback device. In various embodiments, determining a device playback quality for each connected playback device includes streaming a predetermined set of test content to each connected playback device and determining a playback quality rating for each connected playback device. In certain embodiments, the method further includes determining a quality of experience score for paired combinations of each available streaming option and each connected playback device for the playback environment The method, in some embodiments, further includes determining a distance between a user and each connected playback device and determining at least a portion of the quality of experience score based on the distance between the user and each connected playback device. In various embodiments, the method further includes determining a facing direction for the user relative to each connected playback device and determining at least a portion of the quality of experience score based on the facing direction. In certain embodiments, the method\ further includes determining the facing direction for the user based on a comparison of sound measurements of the command to playback the user-selected, the sound measurements selected from a group consisting of relative timing, relative volume, relative frequency, and combinations thereof.

In various embodiments, the method includes determining a viewing window for each connected playback device and determining at least a portion of the quality of experience score based on a user position relative to the viewing window.

One embodiment of a computer program product includes a computer readable storage medium having program instructions embodied therewith. In the embodiment, the program instructions are executable by a processor to cause the processor to determine playback parameters of available streaming options for playing user-selected content in response to receiving a command to play the user-selected content. The instructions are further executable by the processor to cause the processor to determine playback capabilities of connected playback devices and a playback environment of a user of the user-selected content. The instructions are further executable by the processor to cause the processor to perform a comparison of the playback parameters of the available streaming options with the playback capabilities of the connected playback devices in the playback environment and to determine an optimal playback device for playing the user-selected content in the playback environment using the comparison.

FIG. 1 is a schematic block diagram illustrating one embodiment of a system 100 for optimal device selection for streaming content in accordance with one embodiment of the present invention.

Certain providers of audio or video content provide multiple streaming quality types or fidelities for the same content (e.g. same title, same artist, same genre) in the hopes of matching the stream to the capabilities of the users' device. In a smart home environment, multiple devices may be capable of playing a stream for a user such as a smart speaker, a home theater system, or even a laptop or television.

In some smart home environments, when a user issues a streaming command such as "play some music," the command is satisfied by the device that parsed the command (i.e. the media hub begins playing a music video, or the smart assistant begins playing audio). One alternative to this is to prefer a given device for all streaming playback. However, if a stream is limited in bandwidth, there's little value in sending mono audio and 240p video at 10 frame-per-second to the user's projection screen home theater system. For example, a user may have a cell phone, a laptop, and a home media receiver. In such systems, when consuming streaming content today, a user must manually select the connected device or endpoint to play the content, and often that endpoint must either individually request a media stream, or must handle a "3rd party" media stream or device e.g., via mirroring or casting the specific stream accessed by the users' original device.

The apparatuses, system, and methods, disclosed herein, improve streaming media playback technology by providing apparatuses, methods, and systems that are aware of multiple connected playback devices, and which able to match the stream or content to the optimal connected playback for selected content. For example, these embodiments can enable a user to utter a command "Play Star Trek," and in response, one of the embodiments of the apparatuses, methods, or system described herein determines an optimal playback device to satisfy the user's request on a per-user basis.

In one embodiment, the system 100 includes a smart command interface 102. In some embodiments, the smart command interface 102 is embodied in a smart assistant device that connects through a wireless access point to cloud services included in data network 108. In some embodiments, the cloud services included in data network 108 include a smart device manufacture cloud that allows various connected playback devices 106 to communicate with streaming content providers 110.

In various embodiments, the smart command interface 102 also functions as a connected playback device 106. In other embodiments, various playback devices 106 also function as a smart command interface 102 in that some types of playback devices are configured to capture commands including vocal commands and to communicate the vocal commands to a smart home endpoint command module in the cloud services included in data network 108.

In some embodiments, the smart command interface 102 communicates a playback command from a user to select content to be streamed from one or more streaming content providers 110. In various embodiments, the user can select a genre of music, a streaming feed of a radio station, music by a particular artist, a particular song title, a particular on-demand movie, a live video, a TV show, a video channel, a playlist, and the like.

In some embodiments, the system 100 includes multiple connected playback devices 106. For example, in certain embodiments, a smart TV is one example of a connected playback device 106. Other types of connected playback devices in some embodiments include media hubs, computing devices such as laptops, tablets, or smart phones.

In certain embodiments, the smart command interface 102 may be embodied in an app running on a connected playback device 106 that is a digital entertainment system, media hub, or a smart TV. In other embodiments, the smart command interface 102 may be embodied in a wearable device such as a smart watch, smart glasses, virtual reality headset/goggles, and so forth. The depictions of the smart command interface 102 and the connected playback devices 106 show a few examples of the many types of connected playback devices 106 that can be connected to system 100.

In some embodiments, the smart command interface 102 includes at least a portion of a streaming optimization apparatus 104 for optimal device selection for streaming content. In other embodiments, at least a portion of the streaming optimization apparatus 104 is embodied in one or more connected playback devices 106.

In various embodiments, the streaming optimization apparatus 104 determines an optimal connected playback device 106 playback of user selected content. The streaming optimization apparatus 104, in one embodiment, performs a comparison of playback parameters of available streaming options for the user-selected content with playback capabilities of connected playback devices 106 for the current playback environment and determines an optimal playback device for the selected streaming content in the playback environment (e.g., the position and facing direction of the user relative to the connected playback devices 106, user preferences for playback of particular content types on a particular connected playback devices) using the comparison.

In some embodiments, one or more instances of the streaming optimization apparatus 104 are configured to run in a distributed manner with one or more modules included in the streaming optimization apparatus 104 being configured to run on the connected playback devices 106 and one or more modules included in the streaming optimization apparatus 104 being configured to run in the cloud services included in data network 108.

Figure 2:
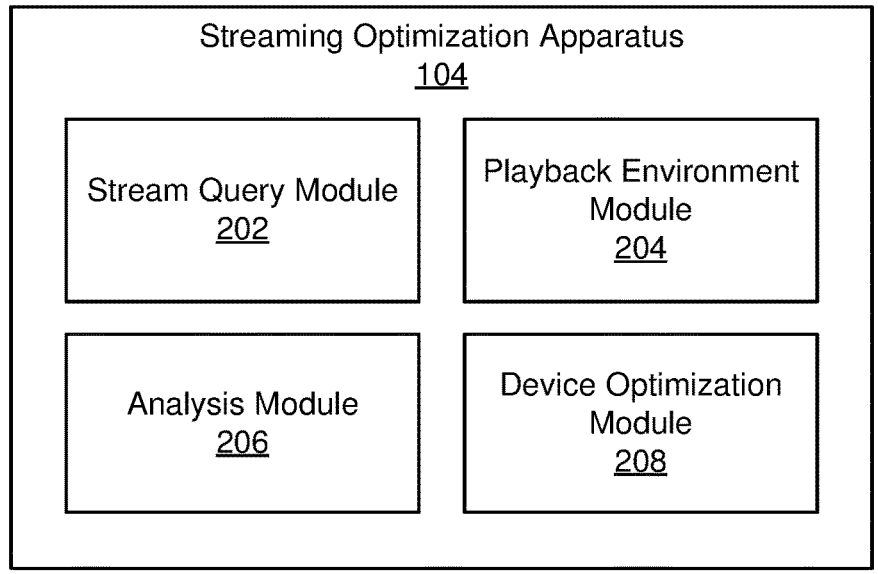
FIG. 2 is a schematic block diagram illustrating one embodiment of an apparatus for optimal device selection for streaming content in accordance with one embodiment of the present invention.

FIG. 2 is a schematic block diagram illustrating one embodiment of an apparatus 200 for optimal device selection for streaming content in accordance with one embodiment of the present invention. The apparatus 200 includes an instance of a streaming optimization apparatus 104. The streaming optimization apparatus 104 includes a stream query module 202, a playback environment module 204, an analysis module 206 and a device optimization module 208, which are described in more detail below.

In one embodiment, the stream query module 202 is configured to determine playback parameters of available streaming options for playing user-selected content in response to receiving a command to play the user-selected content. In some embodiments, the stream query module 202 communicates a query to streaming content providers 110 about the playback parameters of available streaming options for the content selected by the user command.

For example, a user may give a command to a smart command interface 102 to "play my favorite science fiction movie." The stream query module 202 queries the streaming content providers 110 that have the selected content e.g., the user's favorite science fiction movie, available for streaming to determine playback parameters for the available stream options corresponding to the selected user content.

In some embodiments, the playback parameters include parameters such as bandwidth requirements, segment length, encoding requirements, and the like. In other embodiments, the playback parameters include streaming options such as captioning/subtitle available, language options, virtual reality stream availability, 3D stream availability, and so forth. In various embodiments, one or more of the streaming content providers 110 respond to the stream query module 202 by communicating the different bandwidths options for the selected video content. For example, some on-demand video content providers provide video formats suitable for streaming bandwidth options of 0.5, 1.5, 3.0, 5.0 and 25.0 Megabits per second.

The playback environment module 204, in one embodiment, is configured to determine playback capabilities of connected playback devices 106 and a playback environment of a user of the user-selected content.

In certain embodiments, the playback environment module 204 determines playback capabilities of connected playback devices 106 using device specifications such as video or audio resolution, screen size, speaker size, sensitivity, total harmonic distortion, speaker impedance, headroom, number of speakers, and so forth.

In some embodiments, the playback environment module 204 determines playback capabilities of connected devices 106 using subjective parameters provided by a user. For example, even though technically it might be possible to play low resolution streams on a high-resolution connected playback device 106, such as big screen TV, the user, in some embodiments, subjectively excludes playback of low-resolution streams from the playback capabilities of high-resolution connected playback devices 106 based on the user's preferences. In various embodiments, the playback capabilities of connected playback devices 106 may be stored and accessed electronically by the playback environment module 204.

The playback environment module 204, in various embodiments, determines a playback environment of a user of the user selected content. For example, the playback environment of user may take into account the position of one or more connected playback devices 106 relative to one or more users. In some embodiments, two different users in the same room may have a different playback environment depending on different information related to each of the two different users' preferences, positions relative to connected playback devices 106, subjective quality assessments, and so forth. In some embodiments, particular playback devices that are connected playback devices 106 for a first user, are not connected playback devices 106 for a second user. For example, a smart watch worn by the first user is not, in certain embodiments a connected playback device for the second user.

In other embodiments, a first user can issue a command to playback streaming content to connected playback device 106 being used by a second user. For example, in certain embodiments, the first user who is a parent of a second user who is a child can issue a playback command to playback content selected by the first user (parent) to a device being used by the second user (child). Moreover, the first user may configure a playback environment for the second user some embodiments. Similarly, in some embodiments, the position of the user relative to various connected playback devices 106 includes both a distance between the user and each connected playback device 106 and a facing direction of the user relative to each connected playback device 106.

The analysis module 206, in various embodiments, is configured to perform a comparison of the playback parameters of the available streaming options with the playback capabilities of the connected playback devices 106 in the playback environment. In certain embodiments, the analysis module 206 compares the playback parameters of the available streaming options with the playback capabilities of the connected playback devices 106 to determine how well-suited each connected playback device 106 is to play back the available streaming options for the user-selected content. In certain embodiments, the analysis module 206 scores, ranks, or otherwise prioritizes each available streaming option for each connected playback device 106.

The device optimization module 208, in one embodiment, determines an optimal playback device e.g., one of connected playback devices 106, for playing the user-selected content using the comparison of the playback parameters of the available streaming options with the playback capabilities of the connected playback devices 106 and using the playback environment. In some embodiments, the device optimization module 208 uses the comparison of the playback parameters available streaming options with the playback capabilities of the connected playback devices 106 in the form of a score, ranking, or other prioritization provided by the analysis module for determining the optimal playback device. In various embodiments, the device optimization module 208, also uses the playback environment for determining the optimal playback device.

For example, in certain embodiments, a particular connected playback device 106 such as a big-screen TV may have high bandwidth and resolution capabilities that compare well with the high bandwidth and high resolution of available streaming options for the user selected content. However, the device optimization module 208 may receive playback environment information from the playback environment module 204, such as for example, that the facing direction of the user is away from the big screen and towards a screen of a tablet device in the same room. Thus, in some embodiments, the device optimization module 208 determines that the tablet device is the optimal playback device for the selected user content notwithstanding the capabilities of the big screen TV to play back the user-selected content using an available streaming option that would provide higher resolution playback on the big screen TV than on the tablet device.

Figure 3:
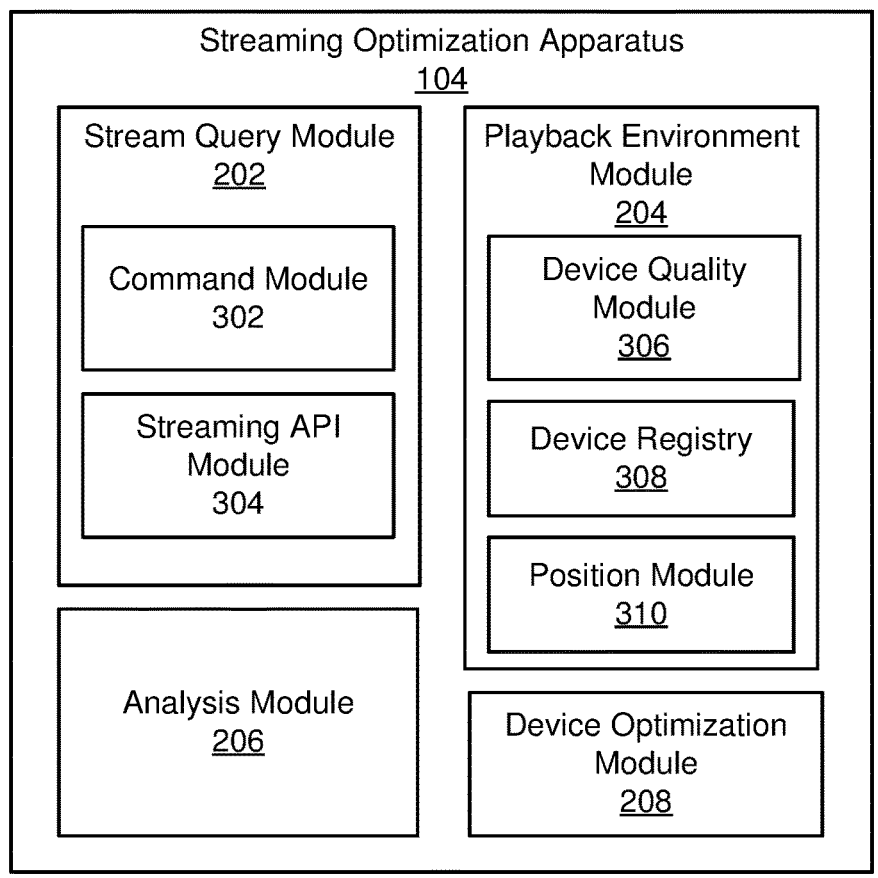
FIG. 3 is a schematic block diagram illustrating another embodiment of an apparatus for streaming content in accordance with one embodiment of the present invention.

FIG. 3 is a schematic block diagram illustrating another embodiment of an apparatus 300 for streaming content in accordance with one embodiment of the present invention. The apparatus 300 includes another instance of a streaming optimization apparatus 104 that includes a stream query module 202, a playback environment module 204, an analysis module 206 and a device optimization module 208, which in various embodiments are substantially similar to the stream query module 202, the playback environment module 204, the analysis module 206 and the device optimization module 208, described above with reference to FIG. 2. The apparatus 300 includes one or more of a command module 302 and streaming API module 304 in the stream query module 202, and a device quality module 306, a device registry 308, and a position module 310 in the playback environment module 204, which are described below.

In various embodiments, the stream query module 202 includes a command module 302 that communicates a command to play content selected by a user to one or more streaming content providers 110. For example, in one embodiment, in response to a command from a user to stream a classic rock music video, the command module 302 communicates the command to several streaming content providers 110. Some streaming content providers 110 may offer the same classic rock music video performed by different artists or performed by the same artist but which are available for streaming with different streaming bandwidth parameters. A first streaming content provider 110a may provide streaming of classic rock music video in full HD while a second streaming content provider 110b may offer the same classic music videos only in a lower resolution.

By communicating the command to multiple streaming content providers 110, the command module 302 improves streaming playback technology by eliminating the need for a user to perform multiple steps to determine which streaming content providers 110 are capable of providing the selected content in a format that can be played back according to the user's preferences using the optimal playback device available.

In some embodiments, the content selected by a user may include automatically selected content based on previous user content selections. In some embodiments, the user may override content automatically selected in response to a general command such as "play some music" by issuing a modifying command such as "skip that song." When a subsequent command to "play some music" is issued by a particular user, the user's previous command to "skip that song" can cause the same song to be skipped again. In certain embodiments, the command module 302 determines a user identity (user ID). In some embodiments, the command module 302 determines the user ID based on settings of a particular application running on the smart command interface 102. In other embodiments, the command module 302 determines a user ID by performing voice recognition on the command.

By automatically determining a user ID, e.g., by using voice recognition, the command module 302 can communicate the user ID to other modules such as the analysis module 206 which can then access user preferences for playing back streaming content using the user ID. The ability to detect and use a user ID to access preferences and to access user accounts associated with the user for multiple streaming content provider sites improves the function of the smart home system by reducing the number of steps that a user would need to perform using conventional smart home system to select an optimal playback device for playing back selected streaming content from a multiple streaming content providers.

In some embodiments, the stream query module 202 includes a streaming application program interface ("API") module 304 that communicates with the streaming content providers 110 using cloud services included in data network 108. In certain embodiments, when a smart home controller, a smart assistant, or other smart home device hears a customer command from the smart command interface 102, such as, "play music by Mozart," the smart home system uses this information to create a message called a directive. This directive contains customer authentication information, an identifier for the smart command interface 102.

In some embodiments, the customer authentication information is used to distinguish between different users of various smart home devices, which in turn, enables access to different user preferences for each authenticated user. In various embodiments, the streaming API module 304 facilitates the ability of the streaming query module 202 to have access to updated functionality and/or new types of streaming applications without necessarily updating the program code of the various modules within the apparatus 300.

In various embodiments, the playback environment module 204 of the streaming optimization apparatus 104 includes a device quality module 306 that determines a device playback quality for each connected playback device 106. In some embodiments, the device quality module 306 determines a device playback quality for each connected playback device by streaming test content to each connected playback device and determining a playback quality rating for each connected playback device 106.

In certain embodiments, the device quality module 306 uses an input such as a microphone or a camera in the smart command interface 102 to capture audio or visual images of the test content being played back by each connected playback device 106. In such embodiments, the device quality module 306 compares the captured images of the test content (audio and/or video) with the original test content and quantifies levels of distortion, loss, errors, and so forth to determine a playback quality rating for the connected playback device 106. Such a comparison could be made whenever a connected playback device 106 is configured or reconfigured.

In other embodiments, the device quality module 306 causes the test content to be played back using each connected playback device 106. In some embodiments, the device quality module 306 then collects a subjective quality rating from the user. In such embodiments, the playback quality rating for each connected playback device 106 can be subjectively established on a per-user basis.

In various embodiments, the device quality module 306 determines playback quality objectively based on product specifications for each connected playback device 106. In some embodiments, the device quality module 306 objectively compares the resolution of the user selected streaming content with physical specifications of the playback device 106. For example, the device quality module 306 can objectively determine that content configured for playback at 720p on a 60-inch 4K TV playback device has objectively bad playback quality.

The playback environment module 204, in some embodiments, includes a device registry 308 that stores information about each connected playback device 106 on a per-user basis. In some embodiments, each device registry 308 is associated with an individual user and is stored for a particular account associated with the individual user for one or more of the cloud streaming services.

In one embodiment, the device registry 308 includes records for each connected playback device 106 used by the user. In various embodiments, the records for each connected playback device 106 include a device endpoint ID. The device endpoint ID identifies which particular smart device is sending or receiving a directive from the smart home controller. For example, a smart speaker on a coffee table may be disposed within hearing distance of a smart picture frame that is configured to respond to verbal commands such that a verbal command from a user could be received by both the smart speaker on the coffee table and the smart picture frame. The device endpoint ID that is communicated along with the command can be used access the preferences in the device registry 308 for each particular smart device.

In some embodiments, the records for each connected playback device 106 also include a playback quality rating (subjective or objective), device capabilities of each connected device such as screen resolution, size, fidelity of the speaker, network interface speed, availability of virtual reality, latency, user preferences and/or priorities on a per-user basis, and so forth. For example, a first user may have a preference for using a tablet to play a particular online game with direct or on-demand video streaming while a second user may have a preference for playing the same game using a big screen projector to project the streaming content. In other embodiments, user preferences can be entered through a nonverbal interface such as a keyboard or touchscreen. In further embodiments, user preferences are inferred using machine learning where the inputs to the machine learning include prior user commands or user preferences related to particular streaming content providers.

In certain embodiments, the analysis module 206 determines a quality of experience score for paired combinations of each available streaming option and each connected playback device for the playback environment. In various embodiments, the quality of experience score for a particular paired combination of a connected playback device 106 and an available streaming option for the user-selected content is derived using a combination of the playback quality rating for each connected playback device 106 and information from the playback environment module 204 relating to a position of a user relative to each connected playback device 106.

In certain embodiments, the analysis module 206 determines a quality of experience score S based on a sum of weighted variable values where the C_VariableName refers to a weighting coefficient that is multiplicatively applied to the variable that follows it in the expression for S, the quality of experience score. In one example embodiment, the quality of experience score:

$$S = \frac{C\_locality}{Distance} + (C\_viewingWindow)(ViewingWindow) +$$
$$(C\_Quality)(DeviceQuality) + (C\_resolution)\sin\left(\frac{StreamResolution}{ScreenResolution}\right) +$$
$$(C\_bandwidth)(DeviceBandwidth) + (C\_VR)(VRAvailable) +$$
$$(C\_Preference)(DevicePreferenceRecord)$$

For example, C_locality is the weighting coefficient for the variable 1/Distance. Distance is a non-zero distance between the user and each connected playback device 106; ViewingWindow is a value that is maximized where a user directly faces a display of a connected playback device from a user position at the center of the field of view of the connected playback device 106 at the Distance. The value of the ViewingWindow diminishes as the user faces away from the display or the user is positioned further to one side or the other from the center of the field of view of the connected playback device 106 at the Distance; DeviceQuality is the device playback quality determined by the device quality module 306; StreamResolution is the resolution of each available streaming option determined by the stream query module 202; ScreenResolution is the resolution of a screen of each connected playback device 106 as determined by the playback environment module 204; DeviceBandwidth is the bandwidth capability of each connected playback device 106 as determined by the playback environment module 204; VRAvailable is the capability of each connected playback device 106 to playback virtual reality content; and DevicePreferenceRecord is a value determined for device preferences on a per-user basis for each connected playback device 106.

In various embodiments, the analysis module 206 determines at least a portion of the quality of experience score based on a different function of the variables described in the example and/or using comparisons of other playback parameters for available streaming options with playback capabilities of each connected playback device 106. The analysis module 206, in certain embodiments, also determines at least a portion of the quality of experience score using different user preferences and user positions relative to the connected playback devices 106 determined by the playback environment module 204 than those user preferences and user positions described in the above example.

For example, in some embodiments, the playback environment module 204 includes a position module 310 that determines a distance between a user and each connected playback device 106. In such embodiments, the analysis module 206 determines at least a portion of the quality of experience score based on the distance between the user and each connected playback device 106. For example, in certain embodiments, in response to a command to play streaming radio content, the analysis module 206 determines a higher quality of experience score for a low resolution connected playback device 106 that is positioned closer to the user then for a higher resolution connected playback device 106 that is positioned farther from the user.

In certain embodiments, the position module 310 further determines a facing direction for the user with respect to each connected playback device 106 and the analysis module 206 determines at least a portion of the quality of experience score based on the facing direction. For example, in such embodiments, the quality of experience score for streaming video content may be higher for a first connected playback device 106 where the where the user is facing towards a display of the first connected playback device 106 and the user is facing away from a display of a second connected playback device 106.

Similarly, in one example embodiment in which audio streaming content selected by a user is recorded in stereo such that left and right channels of a first connected playback device 106 are configured to coordinate sound effects associated with directional movements shown on corresponding video content, analysis module determines a higher quality of experience score for the first connected playback device 106 then for a second playback device 106 that does not include stereo playback capabilities.

Conversely, in some embodiments, for streaming audio content that is encoded for playback on a single channel i.e., mono rather than stereo, the facing direction of a user relative to each playback device 106, the facing direction of the user has no effect on the quality of experience score determined by the analysis module 206.

In some embodiments, the position module 310 determines the distance between the user and each connected playback device and the facing direction for the user based on a comparison of sound measurements of sound traveling between a current location of the user and a device location for each connected playback device 106 using microphones in the smart command interface 102 or in other connected playback devices 106. In various embodiments, the sound measurements are selected from a group consisting of relative timing, relative volume, frequency balance, and combinations thereof. For example, in certain embodiments, the position module 310 compares the relative timing, relative volume and/or the frequency balance of a sound source as detected by two connected audio input devices (e.g., a microphones of smart command interfaces 102 and a microphone in another device such as a second smart command interface 102, or another device such as a laptop, a game console, a smart phone, where the other device is playing the selected content.

In certain embodiments, the position module 310 uses a camera in the smart command interface 102 and/or a camera in one or more of the connected playback devices 106 to determine the position of the user relative to each connected playback device 106. In some embodiments, the position module 310 using facial recognition processing to identify a user's face and to determine a facing direction of the user.

In other embodiments, the position module 310 accesses location and/or movement data from a mobile device of a user (whether or not the mobile device is acting as a connected playback device 106 for playing back the selected user content) to determine the facing direction of the user. For example, in some embodiments, the position module 310 determines from the location and/or movement data (e.g., as captured by an accelerometer) that a user walks a certain number of steps, stops, and then rotates and sits down. Based on the determined location and/or movement data, the position module 310, in certain embodiments, determines that the facing direction of the user is substantially opposite the direction of the sitting down motion.

In certain embodiments, the position module 310 further determines a viewing window for the user with respect to each connected playback device and the analysis module determines at least a portion of the quality of experience score based on the viewing window. In some embodiments, the position module 310 determines a field of view for each connected playback device 106 based on device specification and the distance of the user from each connected playback device and determines the viewing window for the user using the facing direction of the user and the position of the user within the field of view as explained above.

In various embodiments, the playback environment module 204 determines a bandwidth parameter for each available streaming option and a bandwidth capability for each connected playback device and the analysis module determines at least a portion of the quality of experience score based on a highest degree of matching between the bandwidth parameter of a particular stream of the available streaming options and the bandwidth capability of each connected playback device 106. For example, in some embodiments the degree of matching between the bandwidth parameter of a particular stream of the available streaming options and the bandwidth capability of each connected playback device 106 is expressed as a ratio where a 1:1 ratio between the bandwidth of a particular stream and a particular connected playback device maximizes the bandwidth matching portion of the quality of experience score.

In certain embodiments, the device optimization module 208 excludes playback of user-selected content using a selected stream of the available streaming options in response to the bandwidth parameter of the selected stream exceeding bandwidth capabilities of each connected playback device 106. For example, if a user has a preference for playing ultra-high definition ("UHD") video streams but a big screen TV with UHD capabilities is not currently a connected playback device for the user and no other connected playback devices have UHD capabilities, the device optimization module excludes UHD video streams in determining the optimal playback device for the user-selected content.

Figure 4:
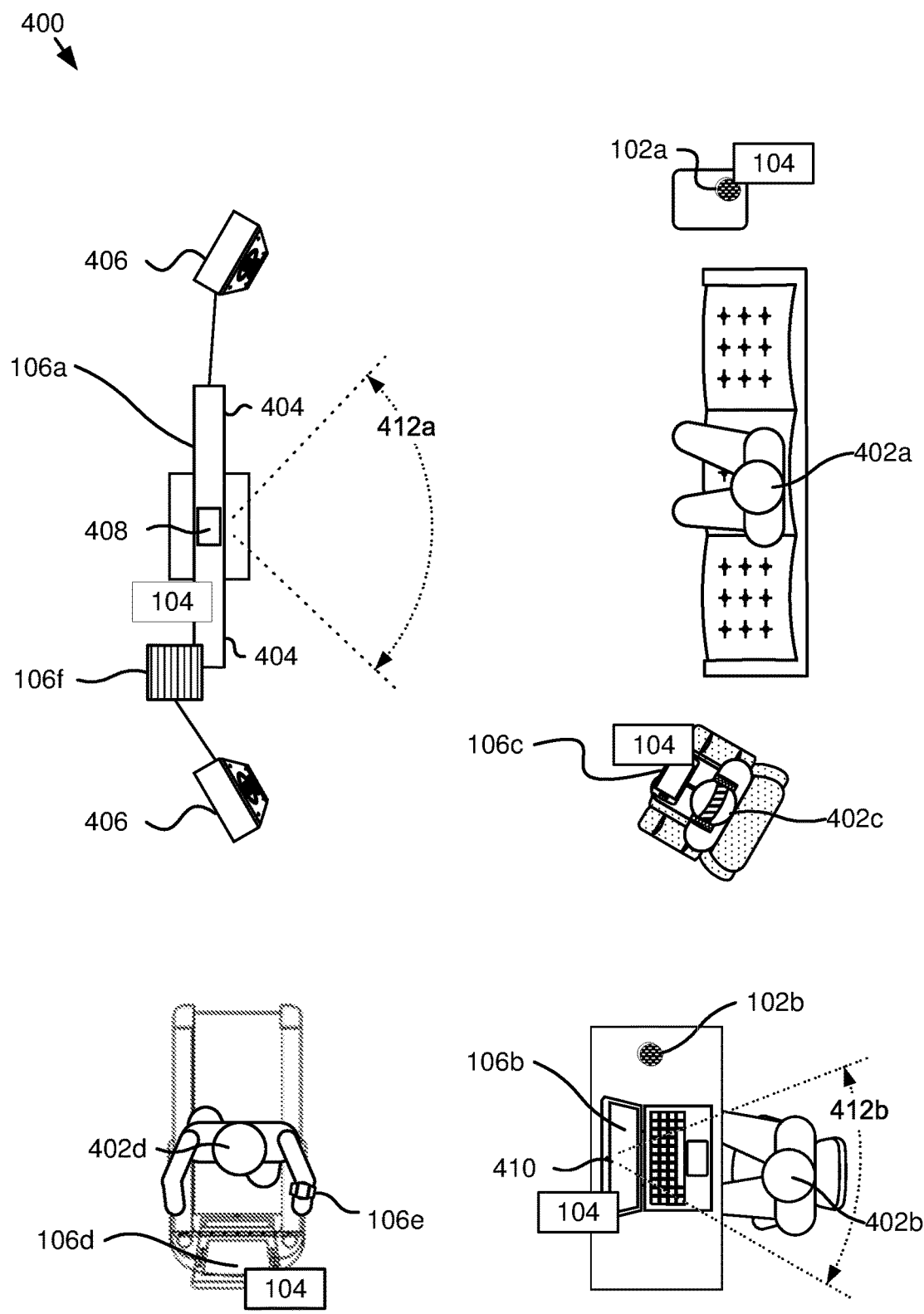
FIG. 4 is a schematic block diagram illustrating an example of optimal device selection for streaming content in accordance with one embodiment of the present invention.

FIG. 4 is a schematic block diagram illustrating an example 400 of optimal device selection for streaming content in accordance with one embodiment of the present invention. In certain embodiments, within the example 400, various playback devices. such as playback devices: 106a (big screen TV), 106b (laptop computer), 106c (tablet computer), 106d (embedded media player), and 106e (smart watch) are depicted within particular playback environments for one or more users depicted in several positions 402a, 402b, 402c, 402d, and 402e.

In the example 400, smart command interfaces 102a, 102b are depicted as being separate devices. Additionally, one or more of the connected playback devices 106a-106e may function as smart command interfaces. One or more of the smart command interfaces 102a, 102b and one or more of the connected playback devices 106a-106e include instances of streaming optimization apparatus 104.

One playback device 106a is a big-screen TV with built-in speakers 404. The big-screen TV is also configured to play back through a playback device 106f (entertainment system) that includes hi-fidelity speakers 406. On top of the big-screen TV is a camera 408 that is configured for gaming applications and/or video conferencing.

In the example, a first user at position 402a utters a command "play a music radio station" that is "heard" i.e., received by smart command interface 102a as well as by smart command interface 102b. The streaming optimization apparatus 104 communicates the command to one or more streaming radio providers. A stream query module included within streaming optimization apparatus 104 determines playback parameters of available streaming options in response to receiving the command to play, e.g., FM mono at 64 kbps or FM stereo at 128 kbps. A playback environment module included in the streaming optimization apparatus 104 streaming optimization apparatus 104 determines playback capabilities of the connected playback devices 106a-106e and the smart command interfaces 102a and 102b which also function as connected playback devices.

The playback environment module included in streaming optimization apparatus 104 determines a playback environment for the user at position 402a. A position module included in the playback environment module determines that the distance between the user at position 402a and the smart command interface 102a is less than the distance between the user and the smart command interface 102b. As described above, in some embodiments, distances between a user and each connected playback device used in determining at least a part of a quality of experience score which is used in determining the optimal playback device for the user-selected content.

In certain embodiments, the streaming optimization apparatus 104 also determines a viewing window 412a for the playback device 106a (big screen TV). In the example of FIG. 4, the positions of the first user at position 402a and a second user at position at position 402c, relative to viewing window 412a are suitable for viewing content played back on playback device 106a (big screen TV). A third user at position 402b is clearly within the viewing window 412b of playback device 106b (laptop) but is depicted as not within the viewing window 412a of the playback device 106a (big screen TV). In some embodiments, the facing direction of the user is used in determining whether user is within a viewing window of a particular playback device and determining 624 the quality of experience score is based at least in part on a position of the user relative to the viewing window. In such embodiments, the viewing window portion of a score for the third user at position 402b is lower with respect to the 106a (big screen TV) than with respect to the playback device 106b (laptop).

The playback environment module determines a user preference not to stream radio content to a specific device such as 106b (laptop), 106e (smartwatch), 106c (tablet) or 106d (embedded media player) unless the command to stream content is initiated from the specific device. The user preference affects at least a portion of the quality of experience score for the particular paired combination of the radio stream and each of the specific devices to which the preference applies.

The playback environment module determines bandwidth capability for the connected playback devices 106f (entertainment system), 106a (big screen TV), 102a (first smart command interface) and 102b (second smart command interface). The degree of matching for the 64 kbps FM mono stream is highest with the first and second smart command interfaces 102a and 102b but the quality of experience score is higher for playing the FM mono stream back on 102a because it is close to the user at position 402a.

The playback environment module determines that the degree of bandwidth matching is also high between the 128 kps FM stereo stream and the 106f (entertainment system) is also high. However, the playback environment module also determines that the certain playback capabilities for the playback device 106f (entertainment system) (e.g. signal-to-noise, dynamic range) result in a higher device quality score for the available radio streaming options and thus the device optimization module determines that the playback device 106f (entertainment system) is the optimal playback device for the user selected content.

The example 400 also depicts other scenarios in which certain embodiments of the streaming optimization apparatus 104 determine an optimal playback device for playing user-selected content.

For example, in response to a command from a user to "play TV news" while walking on a treadmill the streaming optimization apparatus 104 may determine that the optimal playback device for playing the user-selected content is the connected playback device 106d (embedded media player in treadmill) by comparing playback capabilities (e.g. display size of the embedded media player is much easier to view than the screen of the smartwatch) and playback environment (e.g., the facing direction of user at position 402e is away from any other playback device with video playback capabilities).

In another scenario, in response to a command by a user at position 402c to "Play a space saga movie" the streaming optimization apparatus 104 determines that the playback device 106a (big screen TV) has the highest sound quality and that the facing direction of the user at position 402c is toward the playback device 106a (big screen TV) so that the user is within the viewing window at a suitable distance. The streaming optimization apparatus 104 also determines that an available streaming option exist which has good bandwidth matching with the playback device 106c (tablet).

The streaming optimization apparatus 104 further determines that tablet has the capability (and is configured) to playback audio of streaming film content through connected headphones. Thus, taking into account the available streaming options and the playback capabilities of the connected playback devices, the streaming optimization apparatus 104 determines based on the comparison of the weighted quality of experience factors for the playback environment, that the optimal playback device for the user selected content is the playback device 106c (tablet) based at least in part on the fact that the user give that command did so with headphones connected.

Thus, the streaming optimization apparatus 104 improves streaming device technology by electronically comparing available streaming options with connected playback device capabilities for a playback environment.

Figure 5:
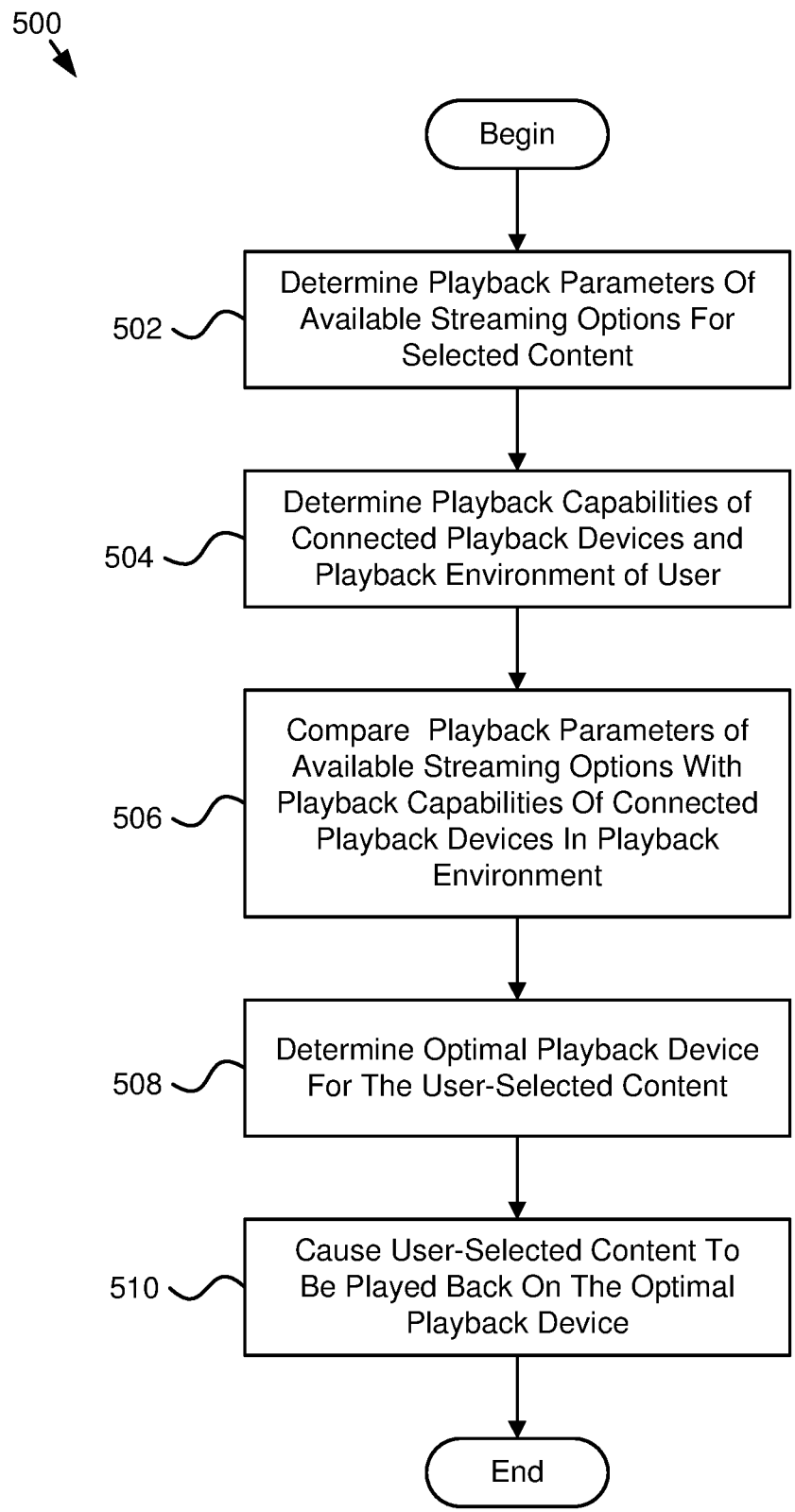
FIG. 5 is a schematic flow chart diagram illustrating one embodiment of a method for optimal device selection for streaming content in accordance with one embodiment of the present invention.

FIG. 5 is a schematic flow chart diagram illustrating one embodiment of a computer-implemented method 500 for optimal device selection for streaming content in accordance with one embodiment of the present invention. In one embodiment, the method 500 begins and determines 502 playback parameters of available streaming options for playing user-selected content in response to receiving a command to play the user-selected content. In the embodiment, the method 500 further determines 504 playback capabilities of connected playback devices and a playback environment of a user of the user-selected content. The method 500 performs 506 a comparison of the playback parameters of the available streaming options with the playback capabilities of the connected playback devices in the playback environment.

The method 500 further determines 508 an optimal playback device for playing the user-selected content using the comparison and the playback environment and causes the user-selected content to be played back on the optimal playback device. In some embodiments, the method 500 continues and causes 510 the user selected content to be played back on the optimal playback device and the method 500 ends. In certain embodiments, the stream query module 202, the playback environment module 204, the analysis module 206, and the device optimization module 208 perform the various steps of the method 500.

Figure 6:
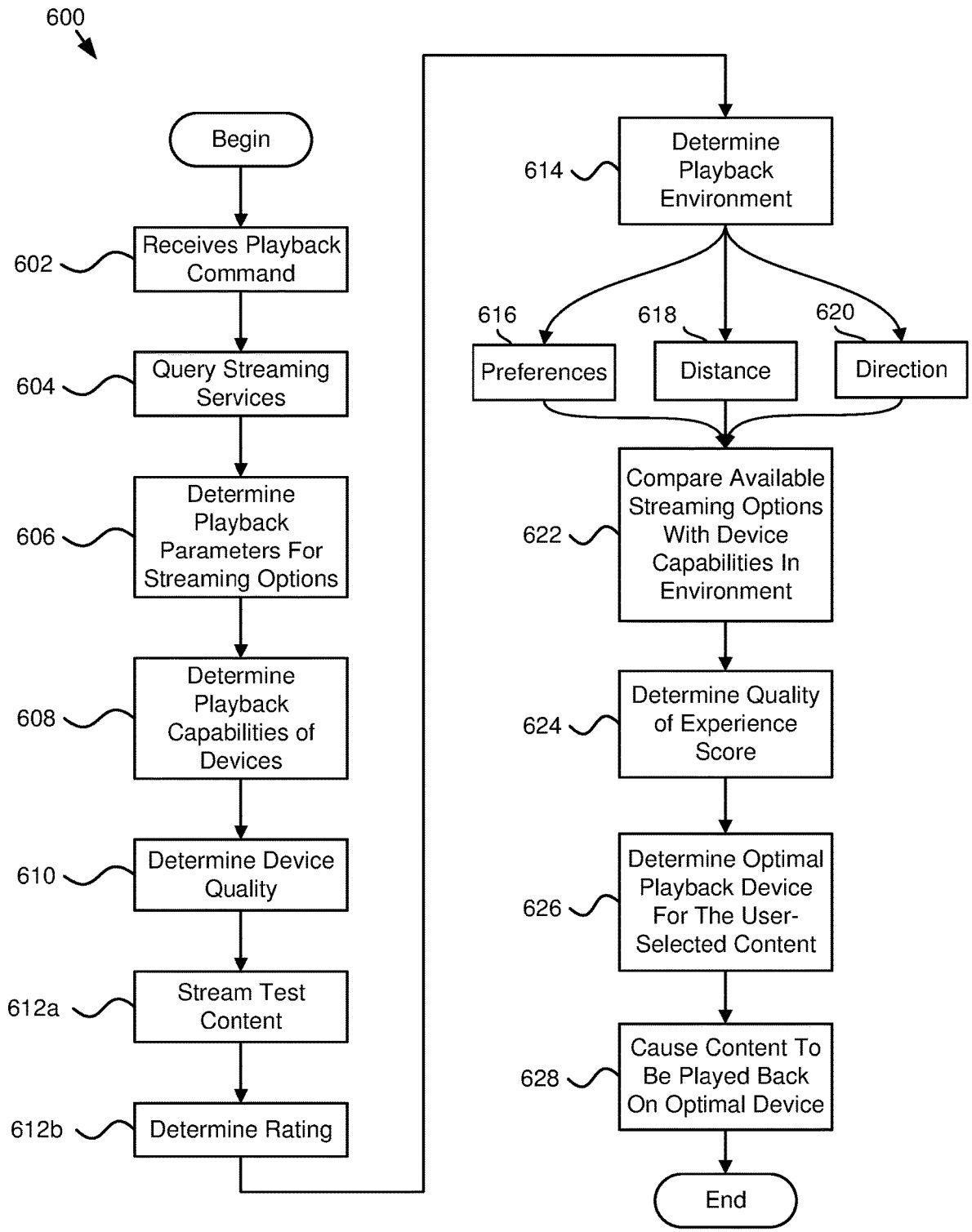
FIG. 6 is a schematic flow chart diagram illustrating another embodiment of a method for optimal device selection for streaming content in accordance with one embodiment of the present invention.

FIG. 6 is a schematic flow chart diagram illustrating another embodiment of a method 600 for optimal device selection for streaming content in accordance with one embodiment of the present invention. In one embodiment, the method 600 begins and receives 602 a command to playback user-selected content. In certain embodiments, the command received may be a verbal command that is interpreted by a command parser. In other embodiments, the command received may be a gesture command, touch command or an electronic communicated command.

In further embodiments, the method 600 queries 604 streaming services for available streams and determines 606 playback parameters of available streaming options in response to receiving the command to play the user-selected content. In some embodiments, available streaming options include encoding options, aspect ratios, versions, bandwidths, streaming content providers, captioning, language options, advertising options, audio channel options, and so forth.

In some embodiments, the method 600 determines 608 capabilities of connected playback devices. In certain embodiments, determining 608 capabilities of connected playback devices includes determining 610 a device quality for each connected playback device. In various embodiments, determining 610 a device quality for each connected playback device is based on performance measurements such as resolution, noise, bandwidth, latency.

In certain embodiments, the method 600 determines 610 a device quality for each connected playback device by streaming 612a a predetermined set of test content to each connected playback device and determining 612b a playback quality rating for each connected playback device. In some embodiments, the playback quality rating is determined subjectively by a user entering the rating while experiencing playback of the test content. In other embodiments, the playback quality rating is determined objectively by electronically comparing playback output with the test content.

In various embodiments, the method 600 determines 614 a playback environment of a user of the user selected content. In certain embodiments, determining 614 the playback environment includes determining 616 user preferences, determining 618 a distance between the user and each of the connected playback devices, and determining 620 a facing direction of the user. In one embodiment, the method 600 includes determining 624 a quality of experience score based at least in part on the facing direction. In certain embodiments, determining 620 a facing direction of user includes accessing position and movement information recorded by one or more devices used by the user. In further embodiments, determining 620 a facing direction of user includes analyzing visual and/or audio images of the user.

In some embodiments, the method 600 determines 620 the facing direction of the user based on the comparison of sound measurements (e.g. relative timing, relative volume, frequency balance) of a command to playback user-selected content as measured by microphones at different positions. In some embodiments, the facing direction of the user is used in determining whether user is within a viewing window of a particular playback device and determining 624 the quality of experience score is based at least in part on a position of the user relative to the viewing window.

In various embodiments, the method 600 continues and determines 626 an optimal playback device by the comparing 622 playback parameters of the available streaming options with capabilities of the connected playback devices in the playback environment. In some embodiments, the method 600 causes 628 the user selected content to be playback on the optimal playback device and the method 600 ends. In certain embodiments, the stream query module 202, the playback environment module 204, the analysis module 206, the device optimization module 208, the command module 302, the streaming API module 304, the device quality module 36, the device registry 308, and the position module 310 perform the various steps of the method 600.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
   a stream query module that determines playback parameters of available streaming options for playing content selected by a user for play in response to receiving a command to play the user-selected content;
   a playback environment module that concurrently determines playback capabilities of two or more connected playback devices available to play the user-selected content and a playback environment of a user of the user-selected content; and
   an analysis module that performs a comparison of the playback parameters of the available streaming options with the playback capabilities of the two or more connected playback devices in the playback environment; and
   a device optimization module that determines an optimal playback device of the two or more connected playback devices for playing the user-selected content using the comparison and the playback environment and causes the user-selected content to be played back on the optimal playback device in response to determining the optimal playback device,
   wherein at least a portion of said modules comprise one or more of hardware circuits, a programmable hardware device and executable code, the executable code stored on one or more computer readable storage media.

2. The apparatus of claim 1, wherein the playback environment module further comprises a device quality module that determines a device playback quality for each of the two or more connected playback devices.

3. The apparatus of claim 2, wherein determining the device playback quality for each of the two or more connected playback devices comprises streaming a predetermined set of test content to each of the two or more connected playback devices and determining a playback quality for each of the two or more connected playback devices.

4. The apparatus of claim 1, wherein the analysis module determines a quality of experience score for paired combinations of each available streaming option and each of the two or more connected playback devices for the playback environment.

5. The apparatus of claim 4, wherein the playback environment module further comprises a position module that determines a distance between a user and each of the two or more connected playback devices and the analysis module determines at least a portion of the quality of experience score based on the distance between the user and each of the two or more connected playback devices.

6. The apparatus of claim 5, wherein the position module further determines a facing direction for the user with respect to each of the two or more connected playback devices and the analysis module determines at least a portion of the quality of experience score based on the facing direction.

7. The apparatus of claim 6, wherein the position module determines the distance between the user and each of the two or more connected playback devices and the facing direction for the user based on a comparison of sound measurements of sound traveling between a current location of the user and a device location for each of the two or more connected playback devices, the sound measurements selected from a group consisting of relative timing, relative volume, frequency balance, and combinations thereof.

8. The apparatus of claim 6, wherein the position module further determines a viewing window for the user with respect to each of the two or more connected playback devices and the analysis module determines at least a portion of the quality of experience score based on a user position within the viewing window.

9. The apparatus of claim 8, wherein the position module determines the viewing window for the user by analyzing a captured image of the user.

10. The apparatus of claim 4, wherein the playback environment module further determines a bandwidth capability for each of the two or more connected playback devices and determines a bandwidth parameter for each available streaming option, and wherein the analysis module determines at least a portion of the quality of experience score based on a highest degree of matching between the bandwidth capability and the bandwidth parameter.

11. The apparatus of claim 10, wherein the device optimization module excludes playback of user-selected content using a selected stream of the available streaming options in response to the bandwidth parameter of the selected stream exceeding bandwidth capabilities of each of the two or more connected playback devices.

12. A computer-implemented method comprising:
determining playback parameters of available streaming options for playing content selected for play by a user in response to receiving a command to play the user-selected content;
concurrently determining playback capabilities of two or more connected playback devices available to play the user-selected content and a playback environment of a user of the user-selected content;
performing a comparison of the playback parameters of the available streaming options with the playback capabilities of the two or more connected playback devices in the playback environment;
determining an optimal playback device of the two or more connected playback devices for playing the user-selected content using the comparison and the playback environment; and
causing the user-selected content to be played back on the optimal playback device in response to determining the optimal playback device.

13. The computer-implemented method of claim 12, wherein determining playback capabilities of the two or more connected playback devices comprises determining a device quality for each of the two or more connected playback devices.

14. The computer-implemented method of claim 13, wherein determining a device playback quality for each of the two or more connected playback devices comprises streaming a predetermined set of test content to each of the two or more connected playback devices and determining a playback quality rating for each of the two or more connected playback devices.

15. The computer-implemented method of claim 12, further comprising determining a quality of experience score for paired combinations of each available streaming option and each of the two or more connected playback devices for the playback environment.

16. The computer-implemented method of claim 15, further comprising determining a distance between a user and each of the two or more connected playback devices and determining at least a portion of the quality of experience score based on the distance between the user and each of the two or more connected playback devices.

17. The computer-implemented method of claim 16, further comprising determining a facing direction for the user relative to each of the two or more connected playback devices and determining at least a portion of the quality of experience score based on the facing direction.

18. The computer-implemented method of claim 17, further comprising determining the facing direction for the user based on a comparison of sound measurements of the command to playback the user-selected content, the sound measurements selected from a group consisting of relative timing, relative volume, relative frequency, and combinations thereof.

19. The computer-implemented method of claim 18, further comprising determining a viewing window for the user with respect to each of the two or more connected playback devices and determining at least a portion of the quality of experience score based on a position of the user relative to the viewing window.

20. A computer program product comprising a computer readable storage medium having program instructions embodied therewith, the program instructions executable by a processor to cause the to:
determine playback parameters of available streaming options for playing content selected for play by a user in response to receiving a command to play the user-selected content;
determine playback capabilities of two or more connected playback devices available to play the user-selected content and a playback environment of a user of the user-selected content; and
perform a comparison of the playback parameters of the available streaming options with the playback capabilities of the two or more connected playback devices in the playback environment;
determine an optimal playback device of the two or more connected playback devices for playing the user-selected content using the comparison and the playback environment; and
cause the user-selected content to be played back on the optimal playback device in response to determining the optimal playback device.

* * * * *